Patented Nov. 28, 1933

1,936,607

UNITED STATES PATENT OFFICE 1,936,607

PURIFICATION OF TRINITROTOLUENE

William H. Rinkenbach, Dover, N. J.

No Drawing. Application January 15, 1932
Serial No. 586,973

3 Claims. (Cl. 260—142)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to the purification of trinitrotoluene, dinitrotoluene and other organic compounds having similar solubility characteristics.

Carbon tetrachloride has been used as an industrial solvent for the purification by recrystallization of TNT, the small percentage of TNT retained by the mother liquor resulting in high recoveries of the solute. However, even at temperatures approaching its boiling point, carbon tetrachloride dissolves but one quarter of its weight of TNT, so that an undesirably high ratio of solvent to solute is necessary. This is uneconomical with respect to cost of solvent per pound of TNT recrystallized and also with respect to output per unit volume of plant capacity.

Ethylene dichloride, on the other hand, may be considered to have too great a solubility action on TNT at both low and high temperatures to permit the economical or practical use of this solvent alone for the purification by recrystallization of TNT. At low temperatures the mother liquor retains a relatively high percentage of TNT, and at higher temperatures the concentrations established are such that, on cooling, a cake of TNT containing occluded solvent would be formed. If an excess of ethylene dichloride were used, the loss through retention of TNT by the mother liquor would be increased greatly.

The solubilities of trinitrotoluene in carbon tetrachloride and ethylene dichloride, at various temperatures, are shown in the following table, the measure being in grams of trinitrotoluene per 100 grams of solvent:

| Temperature | Carbon tetrachloride | Ethylene dichloride |
|---|---|---|
| °C. | | |
| 0 | 0.2 | 10 |
| 10 | 0.4 | 25 |
| 20 | 0.65 | 34 |
| 30 | 1.01 | 53 |
| 40 | 1.75 | 100 |
| 50 | 3.23 | 194 |
| 60 | 6.90 | 422 |
| 70 | 17.35 | 857 |
| 75 | 24.35 | |

From these values it is apparent that the solvent action of ethylene dichloride on TNT is so much greater than that of carbon tetrachloride that properly calculated mixtures of the two solvents can be used more satisfactorily as media for the purification of TNT by recrystallization of washing than can either one alone. Only a relatively small proportion of ethylene dichloride need be used to so increase the solvent action of carbon tetrachloride as to introduce notable economies in the process because of reduced ratio of solvent to solute and because of greatly increased production per unit of plant capacity.

An additional advantage to be claimed for this process is that it can be used to purify TNT containing dinitrotoluene as an impurity, whereas the sulphite washing process does not remove this compound.

In order that the action of mixtures of these two solvents may be more fully realized, the following examples are given:

I. A recovery of 95% of TNT recrystallized from 3–7 times its weight of a solvent mixture containing 97.4% of carbon tetrachloride and 2.6% of ethylene dichloride. Setting point increased from 78.6° C. to 80° C.

II. A recovery of 95% of TNT crystallized from 2–3 times its weight of a solvent mixture containing 87% of carbon tetrachloride and 13% of ethylene dichloride. Setting point increased from 78.6° C. to 80.17° C.

III. A recovery of 97.9% of TNT purified by washing with 0.88 of its weight of a solvent mixture containing 85.2% of carbon tetrachloride and 14.8% of ethylene dichloride. Setting point increased from 78.6° C. to 79.9° C.

The foregoing table and examples will afford sufficient information to those skilled in the art to enable them to determine the particular mixture required for a specific problem.

I claim.

1. A method of purification of trinitrotoluene and compounds having similar solubility characteristics which consists in recrystallizing trinitrotoluene from a solution in which the solvent consists of a mixture of carbon tetrachloride and ethylene dichloride.

2. A method of purification of trinitrotoluene and compounds having similar solubility characteristics which consists in washing trinitrotoluene with a solvent consisting of a mixture of carbon tetrachloride and ethylene dichloride.

3. In a method of purification of trinitrotoluene and compounds having similar solubility characteristics the step of submitting the trinitrotoluene to the action of a solvent consisting of carbon tetrachloride and ethylene dichloride.

WILLIAM H. RINKENBACH.